(12) United States Patent
Yan et al.

(10) Patent No.: US 9,646,156 B2
(45) Date of Patent: *May 9, 2017

(54) SYSTEM AND METHOD FOR DETECTING OBD-II CAN BUS MESSAGE ATTACKS

(71) Applicant: VisualThreat Inc., San Jose, CA (US)

(72) Inventors: Wei Yan, San Jose, CA (US); Kai Peng, Shanghai (CN); JunWu Pan, Shanghai (CN)

(73) Assignee: Visual Threat Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/802,803

(22) Filed: Jul. 17, 2015

(65) Prior Publication Data

US 2016/0019389 A1 Jan. 21, 2016

Related U.S. Application Data

(60) Provisional application No. 62/025,884, filed on Jul. 17, 2014.

(51) Int. Cl.
*G06F 21/55* (2013.01)
*H04W 12/12* (2009.01)
(Continued)

(52) U.S. Cl.
CPC .......... *G06F 21/554* (2013.01); *H04L 63/101* (2013.01); *H04L 63/1416* (2013.01);
(Continued)

(58) Field of Classification Search
CPC ............ G06F 21/554; G06F 2221/034; H04W 12/12; H04W 12/08; H04W 4/046; H04L 63/1425; H04L 63/101; H04L 63/1416
See application file for complete search history.

(56) References Cited

U.S. PATENT DOCUMENTS

| 8,621,065 B1 * | 12/2013 | Saurel ................ H04L 63/1466 709/200 |
| 2011/0113107 A1 * | 5/2011 | Hartwich .......... H04L 12/40032 709/206 |

(Continued)

FOREIGN PATENT DOCUMENTS

CN 105279421 * 1/2016 ............. G06F 21/44

OTHER PUBLICATIONS

Yan, Office Action, U.S. Appl. No. 14/801,582, Feb. 1, 2017, 17 pgs.

*Primary Examiner* — Michael Pyzocha
(74) *Attorney, Agent, or Firm* — Morgan, Lewis & Bockius LLP

(57) ABSTRACT

The present application discloses method and system for detecting potential security attacks against a vehicle networking through an OBD-II port. The system establishes an inbound OBD-II CAN message whitelist and an outbound OBD-II CAN message blacklist, respectively. Upon receipt of a CAN message command, the system updates statistics for the command and determines whether the command is inbound or outbound. In response to an inbound command from a device external to the vehicle, the system compares the inbound command with the whitelist and forwards the inbound CAN message command to the vehicle via the vehicle's OBD-II port when inbound command appears in the whitelist. In response to an outbound CAN message command from the vehicle, the system compares the outbound command with the blacklist and prevents the outbound command from being sent to an external vehicle via the vehicle's OBD-II port when the outbound command appears in the blacklist.

12 Claims, 2 Drawing Sheets

(51) Int. Cl.
    *H04L 29/06*     (2006.01)
    *H04W 12/08*    (2009.01)
    *H04W 4/04*     (2009.01)

(52) U.S. Cl.
    CPC ......... *H04L 63/1425* (2013.01); *H04W 12/08*
        (2013.01); *H04W 12/12* (2013.01); *G06F*
        *2221/034* (2013.01); *H04W 4/046* (2013.01)

(56) References Cited

U.S. PATENT DOCUMENTS

| | | | |
|---|---|---|---|
| 2011/0227709 A1 | 9/2011 | Story | |
| 2012/0046807 A1* | 2/2012 | Ruther | B60R 25/24 701/2 |
| 2012/0129544 A1* | 5/2012 | Hodis | H04W 48/04 455/456.1 |
| 2013/0157640 A1* | 6/2013 | Aycock | H04W 4/046 455/418 |
| 2014/0143839 A1* | 5/2014 | Ricci | H04W 12/06 726/4 |
| 2014/0259143 A1* | 9/2014 | Kuhnl | G08C 25/00 726/11 |
| 2014/0274026 A1* | 9/2014 | Mahar | H04W 48/04 455/419 |
| 2015/0172919 A1* | 6/2015 | Basnayake | H04W 4/14 455/411 |
| 2015/0191135 A1* | 7/2015 | Ben Noon | B60R 16/023 726/22 |
| 2015/0210288 A1* | 7/2015 | Luong | H04L 51/046 701/49 |
| 2016/0012653 A1* | 1/2016 | Soroko | G07C 9/00007 340/5.61 |

\* cited by examiner

SYSTEM AND METHOD FOR DETECTING OBD-II CAN BUS MESSAGE ATTACKS

RELATED APPLICATION

This application claims priority to U.S. Provisional Patent Application No. 62/025,884, entitled "SYSTEM AND METHOD FOR DETECTING OBD-II CAN BUS MESSAGE ATTACKS," filed Jul. 17, 2014, which is incorporated by reference in its entirety.

TECHNICAL FIELD

The present application generally relates to vehicle safety, and in particular, to system and method for detecting OBD-II CAN BUS message attacks.

BACKGROUND

On-board diagnostics (OBD) is a vehicle's self-diagnostic and reporting system, which gives the vehicle owner or repair technician access to the status of the various vehicle sub-systems, e.g., transmission, airbags, antilock braking/ABS, cruise control, electric power steering, etc. OBD systems use a standardized digital communications port to provide real-time data in addition to a standardized series of diagnostic trouble codes (DTCs), which allow one to rapidly identify and remedy malfunctions within the vehicle.

The second generation of OBD standard, OBD-II, defines the type of diagnostic connector and its pinout, the electrical signaling protocols available, and the message format. The OBD-II standard provides a list of vehicle parameters to monitor along with how to encode the data for each parameter. The OBD-II standard also provides an extensible list of DTCs. As a result of this standardization, a single diagnostic device can query the on-board computer(s) in any vehicle that supports the OBD-II standard.

For example, the OBD-II standard provides access to data from the engine control unit (ECU) and offers valuable information when troubleshooting problems inside a vehicle. In particular, the OBD-II standard defines a method for requesting various diagnostic data and a list of standard parameters that might be available from the ECU. The various parameters that are available are addressed by parameter identification numbers (PIDs) defined in the OBD-II standard. The PID request and data retrieval system gives access to real-time performance data as well as flagged DTCs.

Controller area network (CAN) bus is a vehicle bus standard designed to allow microcontrollers and devices inside the vehicle to communicate with each other without a host computer. CAN bus is a message-based protocol designed specifically for automotive applications but also used in other areas such as aerospace, maritime, industrial automation and medical equipment.

The OBD-II port system can collect engine data, driver profiles, and other information useful for vehicle diagnostics, repair and maintenance. When a vehicle fails, the diagnostic device can access the error code defined by the OBD-II standard through which users can easily tell what is going on with their vehicles and their driving habits or profiles. In particular, CAN bus is used to interconnect different controllers like ECUs within the vehicle for data exchange with the diagnostic device. Since more and more vehicles are equipped with wireless communication capabilities (e.g., Wi-Fi, 2G, 3G, 4G or Bluetooth), mobile devices such as smartphones or tablet computers have been used for displaying the diagnostic information.

However, issues with OBD-II security becomes more and more serious since hackers may send malicious CAN message commands through the OBD-II port to vehicles via the wireless communication channels, trying to control the cars. For example, a hacker can send malicious CAN message commands into a car to control the brake or steering wheel while the car is driving. Therefore, it is important to find a way of detecting and preventing such auto attacks via the OBD-II port.

SUMMARY

The above deficiencies and other problems associated with the conventional approach of vehicle diagnostics are reduced or eliminated by the present application disclosed below. In some embodiments, the present application is implemented in a computing device that has one or more processors, memory and one or more modules, programs or sets of instructions stored in the memory for performing multiple functions and communicating with one or more client devices (e.g., a vehicle's ECUs or a smartphone) that has one or more processors, memory and one or more modules, programs or sets of instructions stored in the memory for performing multiple functions. Instructions for performing these functions may be included in a computer program product configured for execution by one or more processors.

A first aspect of the present application involves a method for detecting security attacks against a vehicle via the vehicle's OBD-II port at an OBD-II CAN message screening system. The OBD-II CAN message screening system is electrically coupled to the vehicle via the OBD-II port. The system stores one inbound OBD-II CAN message whitelist and one outbound OBD-II CAN message blacklist in its memory. In response to receiving an inbound CAN message command from a device external to the vehicle, the system compares the inbound CAN message command with the inbound OBD-II CAN message whitelist and forwards the CAN message command to the vehicle via the vehicle's OBD-II port when the inbound CAN message command appears in the inbound OBD-II CAN message whitelist. However, if the transmission frequency of a CAN message command exceeds a pre-defined threshold, the system blocks the corresponding CAN message command. On the other hand, the outbound OBD-II CAN message blacklist protects sensitive information leakage from the vehicle to the exterior, e.g., the private CAN bus protocol of car makers or unauthorized access of vehicle diagnostic information. In response to receiving an outbound CAN message command, the system compares the outbound CAN message command with the outbound OBD-II CAN message blacklist and blocks the CAN message command when the CAN message command appears in the outbound OBD-II CAN message blacklist.

A second aspect of the present application involves an OBD-II CAN message screening system including an MCU, that is electrically coupled to an CAN message processing module, a communication module, a command statistics module, and an OBD-II CAN message whitelist and blacklist, respectively, to transmit signals between them. The MCU is configured to transmit an inbound or outgoing OBD-II CAN message command received by the communication module to the CAN message processing module. The CAN message processing module is configured to determine whether the inbound or outgoing OBD-II CAN message command appears in the OBD-II CAN message whitelist or blacklist and report the determination to the MCU. The MCU is configured to forward the corresponding OBD-II CAN message command to a vehicle coupled to the OBD-II CAN message screening system via an OBD port.

Various advantages of the present application are apparent in light of the descriptions below.

BRIEF DESCRIPTION OF THE DRAWINGS

In order to more clearly illustrate the embodiments of the present application, the following embodiments reference will be made in the embodiments or the prior art describes the need to introduce a simple, clear, the following description of the drawings only for persons of ordinary skill in the art, in the premise without creative efforts can also obtain other drawings according to these drawings of some embodiments according to the present application.

Like reference numerals refer to corresponding parts throughout the drawings.

DESCRIPTION OF EMBODIMENTS

Reference will now be made in detail to embodiments, examples of which are illustrated in the embedded drawings. In the following detailed description, numerous specific details are set forth in order to provide a thorough understanding of the subject matter represented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 1:
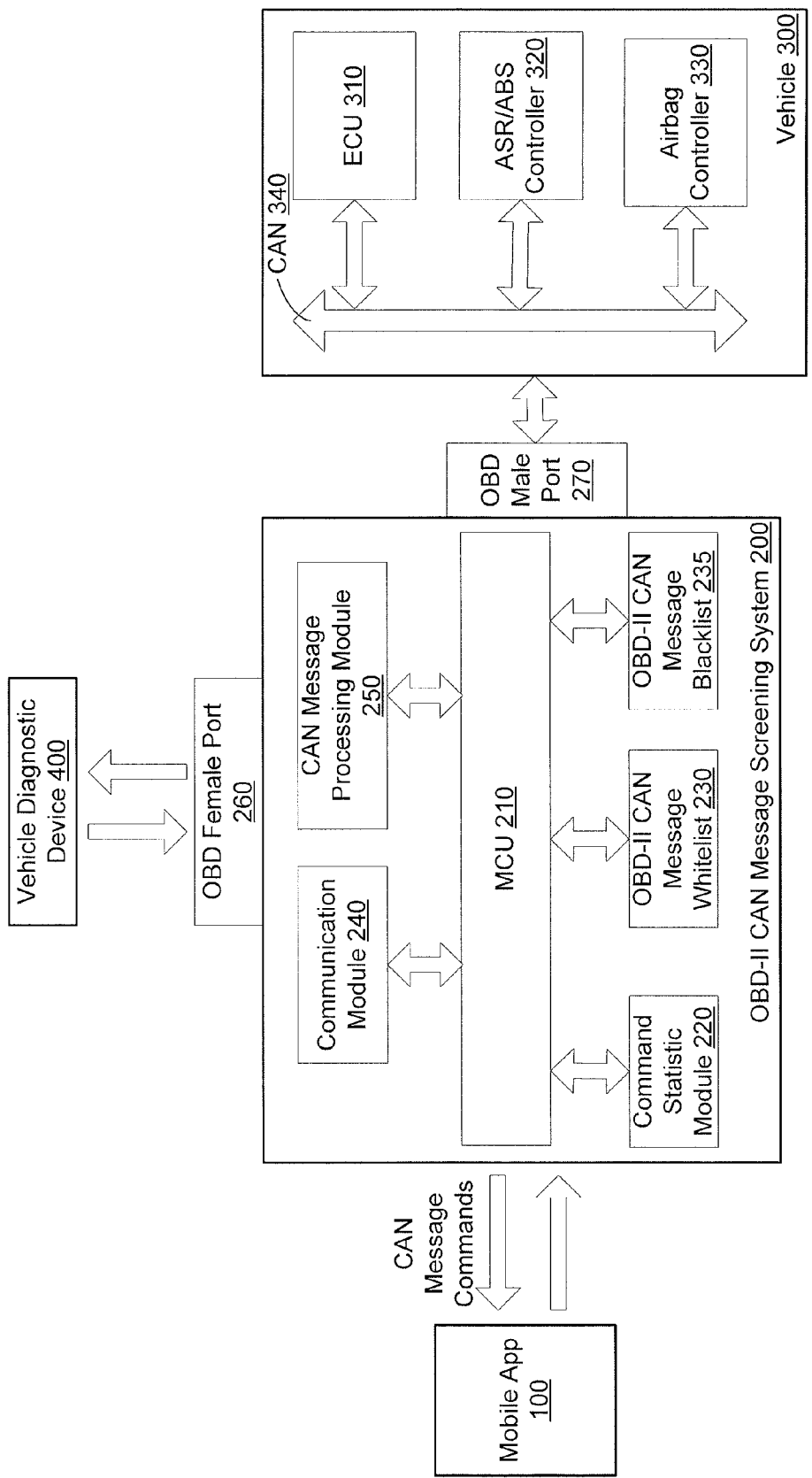
FIG. 1 is a block diagram of an OBD-II CAN message screening system according to some embodiments of the present application.

FIG. 1 is a block diagram of an OBD-II CAN message screening system according to some embodiments of the present application. The OBD-II CAN message screening system 200 includes a micro controller unit (MCU) 210. The MCU 210 is electrically coupled to a command statistics module 220, an OBD-II CAN message whitelist 230, an OBD-II CAN message blacklist 235, a communication module 240, and a CAN message processing module 250, respectively. In some embodiments, the OBD-II CAN message screening system 200 further includes an OBD female port 260 and an OBD male port 270. Through the OBD female port 260, the OBD-II CAN message screening system 200 is electrically coupled to a vehicle diagnostic device 400 so that the vehicle diagnostic device 400 can send diagnostic commands to the vehicle 300 through the OBD male port 270 and receive diagnostic information from the vehicle 300 through the OBD male port 270.

As shown in FIG. 1, the vehicle 300 includes multiple exemplary components related to the present application, such as the ECU 310, the ASR/ABS controller 320, the airbag controller 330, etc., which are electrically coupled to the CAN bus 340. In response to the diagnostic commands from the OBD-II CAN message screening system 200, one of the components in the vehicle 300 generates a reply message and returns the reply message to the OBD-II CAN message screening system 200 via the OBD male port 270.

Within the OBD-II CAN message screening system 200, the OBD-II CAN message whitelist 230 is a list of inbound message commands that are deemed to be benign to the vehicle safety from the perspective of the vehicle operation and the OBD-II CAN message blacklist 230 is a list of outbound message commands that are deemed to be detrimental to the vehicle safety or carry sensitive information whose privacy should be carefully guarded from unintended leakage from the perspective of the vehicle operation. The OBD-II CAN message screening system 200 maintains the whitelist and the blacklist based on the user inputs or other information. In some embodiments, both the whitelist and the blacklist are updated according to a predefined update schedule (e.g., adding new commands to the whitelist/blacklist or eliminating commands from the whitelist/blacklist). The communication module 240 is responsible for communicating with the mobile application 100, which is typically an application running on a mobile device such as a smartphone or a tablet computer. In some embodiments, the communication module 240 supports the wireless communication protocols such as Wi-Fi, 2G, 3G, 4G or Bluetooth when communicating with the mobile application 100. Through this wireless communication channel, the OBD-II CAN message screening system 200 can exchange information such as CAN message commands with the mobile application 100.

But as noted above, there is a potential risk of using this wireless communication channel to communicate with the device external to the vehicle because somebody may use this wireless communication channel to launch malicious attacks (e.g., issuing commands detrimental to vehicle safety or stealing sensitive information from the vehicle) against the vehicle operation. Therefore, the OBD-II CAN message screening system 200 is configured to detect such attacks and notify the driver of the vehicle when such attacks were detected. In this example, the CAN message processing module 250 is primarily responsible for detecting malicious attacks. The command statistics module 220 is responsible for monitoring different message commands and generating statistical information for different message commands received by the OBD-II CAN message screening system 200. From such statistical information, it is possible to uncover a pattern of security attacks and use such pattern to capture security attacks launched against the vehicle. For example, when the transmission frequency of an inbound/outbound message command exceeds a predefined threshold, such command may be deemed as being a potential Denial of Service (DoS) attack.

Figure 2:
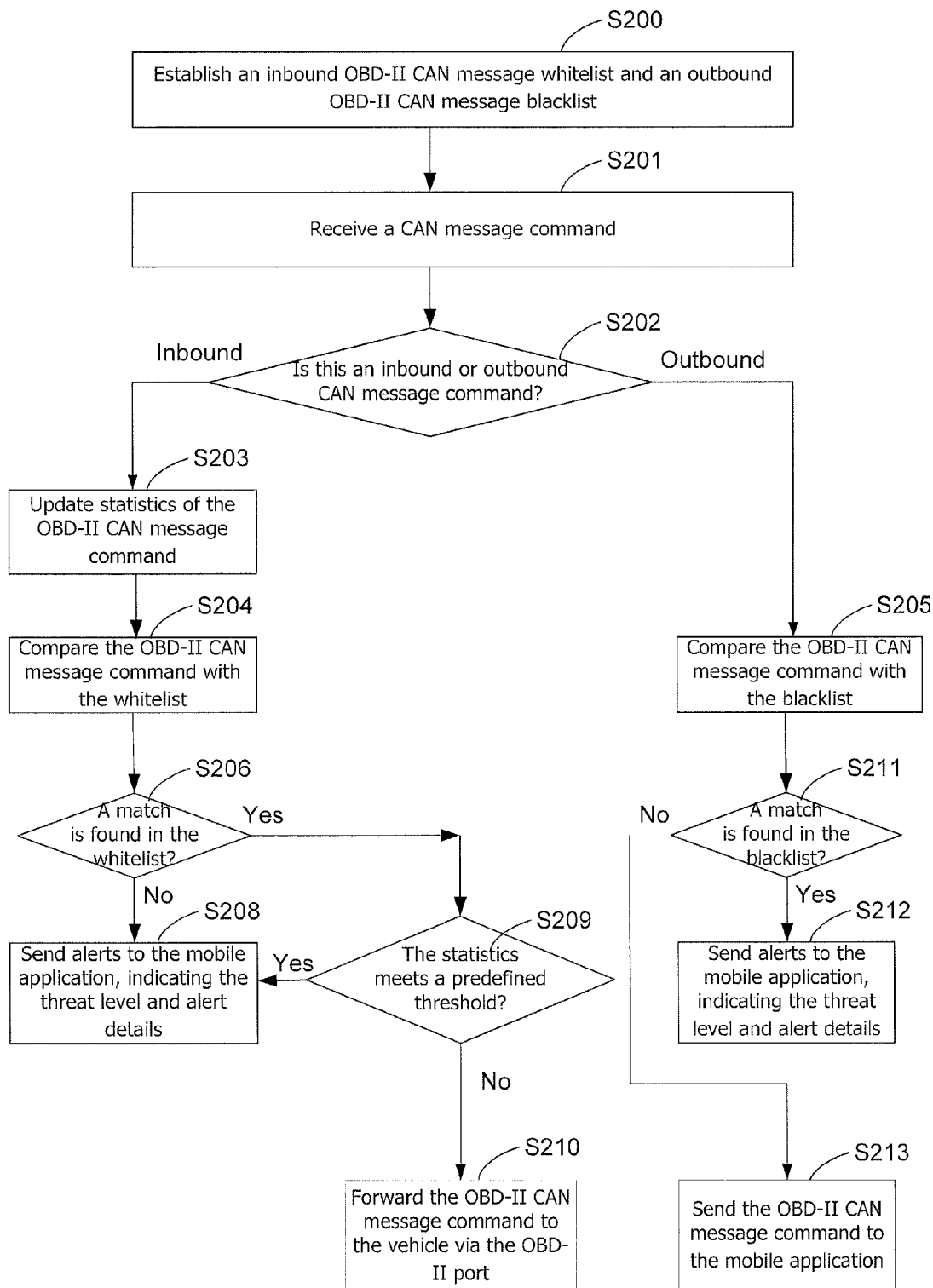
FIG. 2 is a flow chart illustrative of how the OBD-II CAN message screening system detects malicious attacks against a vehicle according to some embodiments of the present application.

FIG. 2 is a flow chart illustrative of how the OBD-II CAN message screening system detects malicious attacks against a vehicle according to some embodiments of the present application.

First, the OBD-II CAN message screening system 200 establishes (S200) an inbound OBD-II CAN message whitelist and an outbound OBD-II CAN message blacklist. CAN message commands appearing in the whitelist are deemed to be safe and would not cause harm to the vehicle or the driver of the vehicle. CAN message commands appearing in the blacklist are deemed to be sensitive, e.g., containing private information whose leakage may be detrimental to the vehicle safety and may cause harm to the vehicle or the driver of the vehicle. Such whitelist and blacklist can be pre-installed in the OBD-II CAN message screening system 200 and updated using the mobile application 100 periodically or whenever required. Upon receipt of a CAN message command (S201), the OBD-II CAN message screening system 200 checks whether the CAN message command is an inbound or outbound CAN message command (S202). If the CAN message command is an outbound CAN message command, the OBD-II CAN message screening system 200 compares the OBD-II CAN message command with the blacklist (S205). If a match is found in the blacklist (S211—Yes), this message command is deemed to be carrying sensitive information and the OBD-II CAN message screening system 200 prevents the outbound OBD-II CAN message command from being sent out and sends (S212) alerts to the mobile application 100. Otherwise (S211—No), it is assumed that such command would not cause any harm to the vehicle or the driver. Accordingly, the OBD-II CAN message screening system 200 (S213) sends the outbound CAN message command to the mobile application 100 or the vehicle diagnostic device 400 for further processing.

If the CAN message command is an inbound CAN message command, the OBD-II CAN message screening system 200 updates (S203) statistics of the OBD-II CAN message command. For example, the OBD-II CAN message screening system 200 may count the frequency of different CAN message commands for a given time period. In some embodiments, the OBD-II CAN message screening system 200 updates the statistics before determining whether it is an inbound or outbound command at step S202. The OBD-II CAN message screening system 200 then compares (S204) the OBD-II CAN message command with the whitelist. There are two possible outcomes. If there is no match found in the whitelist (S206—No), the OBD-II CAN message screening system 200 determines that the inbound message command may pose a threat to the vehicle's operation and then block the inbound message command from being sent into the vehicle and send (S208) alerts to the mobile application 100, indicating the corresponding threat level and other alert details based on the specific command. But even if there is a match found in the whitelist (S206—Yes), there is no guarantee that the command is benign and can be sent to the vehicle. For example, an inbound CAN message command may still pose a potential threat to the safe operation of the vehicle (which may cause a DoS attack) when its transmission frequency exceeds a predefined threshold (e.g., when a third party injects too many benign CAN message commands within a short time window). As noted above in connection with Step 203, the OBD-II CAN message screening system 200 may determine a total number of times by which the command has been received by the OBD-II CAN message screening system 200 within a predefined time period, i.e., the transmission frequency of the message command. Using such statistical information, the OBD-II CAN message screening system 200 checks (S209) whether the statistics meets a predefined threshold or not. If the threshold is met (S209—Yes), the OBD-II CAN message screening system 200 determines that such command is deemed to be a malicious attack and then sends (S208) alerts to the mobile application 100, indicating the threat level and alert details based on the specific command. In some embodiments, the OBD-II CAN message screening system 200 also updates the whitelist by removing the message command from the whitelist. Otherwise (S209—No), the OBD-II CAN message screening system 200 may treat the message command as still be benign and then forwards (S210) the message command to the vehicle. Upon receipt of the inbound message command, the vehicle 300 (or one of the components coupled to the CAN 340) then performs predefined operations in accordance with the command.

In sum, the present application is to provide a network access based on vehicle OBD-II standard for detecting information security attacks, which can prevent dangerous or malicious commands through the command interface from entering into a vehicle or leaking sensitive information from the vehicle using the OBD-II transmission, thereby greatly improving the vehicle's safety.

To achieve the above objects, the present application provides the following technical solution: a vehicle networking access OBD-II information security detection method based on the following steps: S1, establish OBD-II control commands whitelist and blacklist; S2, a CAN report packet filtering processing module for parsing packets received from the outside or inside and comparing them with the vehicle control command transmission; and S3, when the inbound control command is found in the whitelist, the system forwards the command to the vehicle through the OBD-II port, or when the outbound control command is found in the blacklist, the system prevents the command from being sent out of the vehicle through the OBD-II port.

In some embodiments, an OBD-II frequency threshold is defined for each of the whitelist/blacklist of predefined commands. For inbound external instruction or outgoing internal information, the system performs statistical analysis, e.g., determining the statistical frequency per minute.

In some embodiments, when the inbound control command is not the whitelist or the OBD-II instruction statistical frequency exceeds the predefined frequency threshold value, the instruction is still deemed to be dangerous or malicious and will not be forwarded to the vehicle through OBD-II port. In some embodiments, the CAN packet filtering processing module is configured to collect malicious commands, indicating the degree of threat, warning the driver of the vehicle.

This application discloses a detection method and apparatus device for OBD-II CAN message attacks in the industry of internet of vehicle. This application prevents malicious inbound CAN message commands from controlling cars through OBD-II port or sensitive outbound CAN message commands from being released to the external entity through OBD-II port, thus protecting the safety of drivers. The method includes the following steps: S1. Establish a whitelist of inbound OBD-II CAN message commands and a blacklist of outbound OBD-II CAN message commands; S2. CAN message processing module receives the CAN message commands coming from outside of a vehicle or inside the vehicle, parse and compare them with the whitelist/blacklist; and S3. When a certain inbound CAN message command has a match in the whitelist, the CAN message processing module will pass and forward it into the vehicle via the OBD-II port; conversely, when a certain outbound CAN message command has a match in the blacklist, the CAN message processing module will prevent it from being released outside the vehicle via the OBD-II port; (in some embodiments, the transmission frequency of the CAN message command is determined and compared with a predefined threshold, e.g., 10 commands per minute, such that the command is deemed to be a potential threat and denied from reaching the vehicle when its transmission frequency exceeds the threshold); S4. Otherwise, the CAN command will be considered as suspicious or malicious command, and the CAN message processing module will block it instead of passing it into OBD-II port; and S5. Once the CAN message processing module detects the suspicious or malicious CAN message commands, it will send alerts to user's mobile apps, indicating the threat level and details.

The above approach can effectively protect the vehicle against the following auto attack scenarios by monitoring CAN message commands sending through OBD-II port, thus ensuring the drivers' safety:

1. Send malicious CAN BUS commands through OBD-II port into the car via connected PC or mobile devices (tablets or phones) via WI-FI, 2G, 3G, 4G or Bluetooth.

The apparatus device includes an OBD-II CAN message whitelist. When attackers send malicious CAN message commands into the car via OBD-II port, the device will parse and compare these messages with the whitelist. Because commands in the white list are deemed to be not malicious, the attacker's injected malicious command will be blocked if it cannot be found in the whitelist.

2. Inject a large number of CAN messages into OBD-II port as DOS (Denial of Service) attacks.

The OBD-II command statistic module inside the apparatus device is able to calculate the frequency of the injected messages (e.g. how many commands of the same type per minute) and compares the value with a pre-defined command frequency threshold. If the calculated frequency exceeds the threshold, the device will detect it as a DOS (Denial of Service) attack, and then send the alert to users.

3. Crack current OBD-II diagnostic tools or devices or diagnostic mobile apps, and send malicious CAN message commands into the car from mobile apps.

The approach is similar to the one above in connection with screening out malicious message commands using the whitelist.

4. Send sensitive information using the outbound commands through OBD-II port outside the car via connected PC or mobile devices (tablets or phones) via WI-FI, 2G, 3G, 4G or Bluetooth.

The apparatus device includes an OBD-II CAN message blacklist. When hackers try to retrieve sensitive information from the car via OBD-II port, the device will parse and compare these messages with the blacklist. Because commands in the black list are deemed to be either malicious or carry sensitive information (leakage of which might be used in a manner detrimental to the vehicle safety), such commands will be blocked if it is found in the blacklist.

The apparatus device includes an OBD-II 16-pin male port for connecting to a vehicle on one side, an OBD-II 16-pin female port on the other side for connecting to other diagnostic tools, and a main CAN message processing unit. The main CAN message processing unit includes CAN message processing module, MCU (Micro Controller Unit), command statistic module, wireless or Bluetooth communication module, and OBD-II CAN message whitelist. CAN message processing module determines whether received OBD-II CAN message commands should be matched with whitelist/blacklist by the transmission directions or not. Commands in the whitelist are deemed to be not malicious whereas commands in the blacklist are opposite. In some embodiments, for those commands not found in the whitelist or blacklist, the OBD-II command statistic module calculates the frequency of commands (e.g. how many commands per minute) and compares the value with the pre-defined command frequency threshold. A DOS (Denial of Service) alert will be sent to users if the calculated frequency exceeds the threshold even though the corresponding command is in the white list. Communicating module transmits OBD-II attack alert events to mobile apps or to cloud servers via Wi-Fi, 2G, 3G, 4G or Bluetooth so that the attacks can be logged and analyzed later for threat forensics.

The device has an OBD-II 16-pin male socket port joining with OBD-II port on one side, and an OBD-II 16-pin female socket connecting to the vehicle diagnostic OBD-II devices selling on market on the other side. The plug-and-play feature makes it very convenient to deploy the device with other vendors' vehicle diagnosing products. In some embodiments, the OBD-II CAN message screening system 200 as shown in FIG. 1 may be combined with the vehicle diagnostic device 400 together into one device such that the OBD female port may not be necessary or included inside the integrated device. Alternatively, the OBD-II CAN message screening system 200 may be implemented in a mobile device (e.g., a smartphone) that supports the mobile application 100. In this case, the vehicle diagnostic device 400 may communicate with the OBD-II CAN message screening system 200 through the antenna of the mobile device. Regardless of the specific physical configurations, it will be apparent to those skilled in the art that the present application is not limited to the embodiments disclosed in the present application.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter represented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not represent an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

What is claimed is:

1. A method for detecting security attacks against a vehicle via the vehicle's OBD-II (On-Board Diagnostics II) port, the method comprising:
   at an OBD-II CAN (Controller Area Network) message screening system, wherein the OBD-II CAN message screening system is electrically coupled to the vehicle via the OBD-II port:
      establishing an OBD-II CAN inbound message whitelist and an OBD-II CAN outbound message blacklist;
      in response to receiving an inbound CAN message command from a device external to the vehicle,
         updating statistics of the inbound CAN message command;
         comparing the inbound CAN message command with the OBD-II CAN message whitelist alone;
         forwarding the inbound CAN message command to the vehicle via the vehicle's OBD-II port and sending alerts to a mobile application via a wireless communication channel when the updated statistics meets a predefined threshold when the inbound CAN message command appears in the OBD-II CAN message whitelist;
      in response to receiving an outbound CAN message command from the vehicle,
         comparing the outbound CAN message command with the OBD-II CAN message blacklist alone; and
         forwarding the CAN message command to an external device via the vehicle's OBD-II port when the CAN message command does not appear in the OBD-II CAN message blacklist.

2. The method of claim 1, wherein the statistics of the inbound CAN message command includes transmission frequency information by which the inbound CAN message command is received.

3. The method of claim 1, wherein the wireless communication channel is one of a WiFi, 2G, 3G, 4G or Bluetooth communication channel.

4. The method of claim 1, further comprising:
   when the inbound CAN message command is not found in the OBD-II CAN message whitelist, sending alerts to a mobile application via a wireless communication channel.

5. The method of claim 1, further comprising:
   when the outbound CAN message command is found in the OBD-II CAN message blacklist:
      sending alerts to a mobile application via a wireless communication channel.

6. The method of claim 1, wherein the device external to the vehicle is a smartphone that is wirelessly coupled to the OBD-II CAN message screening system or a vehicle diagnostic device that is coupled to the OBD-II CAN message screening system.

7. An OBD-II (On-Board Diagnostics II) CAN (Controller Area Network) message screening system comprising:
   an MCU (Micro Controller Unit); and
   memory that is electrically coupled to the MCU, wherein the memory stores an inbound OBD-II CAN message whitelist and an outbound OBD-II CAN message blacklist and a plurality of program modules to be executed by the MCU, and the plurality of program modules further include a CAN message processing module, a communication module, and a command statistics module;
   wherein:
      the MCU is configured to transmit an inbound OBD-II CAN message command received by the communication module to the CAN message processing module and the command statistic module, respectively;
      the command statistic module is configured to update statistics of the inbound CAN message command and report the updated statistics to the MCU;
      the CAN message processing module is configured to determine whether the inbound OBD-II CAN message command appears in the inbound OBD-II CAN message whitelist alone and report the determination to the MCU;
      the MCU is configured to forward the inbound OBD-II CAN message command to a vehicle coupled to the OBD-II CAN message screening system via an OBD port in accordance with the determination and send alerts to a mobile application via a wireless communication channel when the updated statistics meets a predefined threshold;
      the MCU is configured to transmit an outbound CAN message command from the vehicle to the CAN message processing module and the command statistic module, respectively;
      the CAN message processing module is configured to determine whether the outbound OBD-II CAN message command appears in the outbound OBD-II CAN message blacklist alone and report the determination to the MCU; and
      the MCU is configured to forward the outbound OBD-II CAN message command to an external device coupled to the OBD-II CAN message screening system via the OBD port in accordance with the determination.

8. The system of claim 7, wherein the statistics of the CAN message command includes transmission frequency information by which the CAN message command is received.

9. The system of claim 7, wherein the wireless communication channel is one of a WiFi, 2G, 3G, 4G or Bluetooth communication channel.

10. The system of claim 7, wherein the device external to the vehicle is a smartphone that is wirelessly coupled to the OBD-II CAN message screening system or a vehicle diagnostic device that is coupled to the OBD-II CAN message screening system.

11. The system of claim 7, wherein the OBD-II port is a 16-pin OBD-II physical interface.

12. The system of claim 7, wherein the MCU is configured to send alerts to a mobile application via a wireless communication channel when the inbound CAN message command is not found in the OBD-II CAN message whitelist.

* * * * *